United States Patent
Morishima et al.

(10) Patent No.: US 8,379,333 B2
(45) Date of Patent: Feb. 19, 2013

(54) IMAGING MODULE

(75) Inventors: Riyou Morishima, Setagaya-ku (JP); Katsumi Tsuji, Setagaya-ku (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/202,954

(22) PCT Filed: Feb. 17, 2010

(86) PCT No.: PCT/JP2010/052302
§ 371 (c)(1),
(2), (4) Date: Oct. 18, 2011

(87) PCT Pub. No.: WO2010/095627
PCT Pub. Date: Aug. 26, 2010

(65) Prior Publication Data
US 2012/0025678 A1 Feb. 2, 2012

(30) Foreign Application Priority Data
Feb. 23, 2009 (JP) .................................. 2009-038795

(51) Int. Cl.
*G02B 7/02* (2006.01)
(52) U.S. Cl. ........................................ 359/819
(58) Field of Classification Search .................. 359/811, 359/819
See application file for complete search history.

(56) References Cited

U.S. PATENT DOCUMENTS

| 2006/0202293 A1* | 9/2006 | Bogdan et al. ................. 257/432 |
| 2007/0051646 A1 | 3/2007 | Imoto et al. ................. 206/316.2 |

FOREIGN PATENT DOCUMENTS

| JP | 06-072856 | 10/1994 |
| JP | 2002-185826 | 6/2002 |
| JP | 2003-161870 | 6/2003 |
| JP | 2004-120464 | 4/2004 |
| JP | 2007-062670 | 3/2007 |
| JP | 2007-507139 | 3/2007 |

* cited by examiner

*Primary Examiner* — Joseph P Martinez
(74) *Attorney, Agent, or Firm* — DLA Piper LLP (US)

(57) ABSTRACT

An imaging module includes a front case which is configured to mount a lens unit on a subject side, a rear case which is mounted to the front case and configured to seal an imaging substrate in an interior space between the rear case and the front case, and a bracket mounted to the rear case. The rear case is mounted to the front case with first screws which is screwed into screw fastening holes and first screw fastening through-holes, and the bracket is mounted to the rear case with second screws, which are screwed into the first screw fastening through-holes and second screw fastening through-holes and have a diameter larger than that of the first screws.

3 Claims, 1 Drawing Sheet

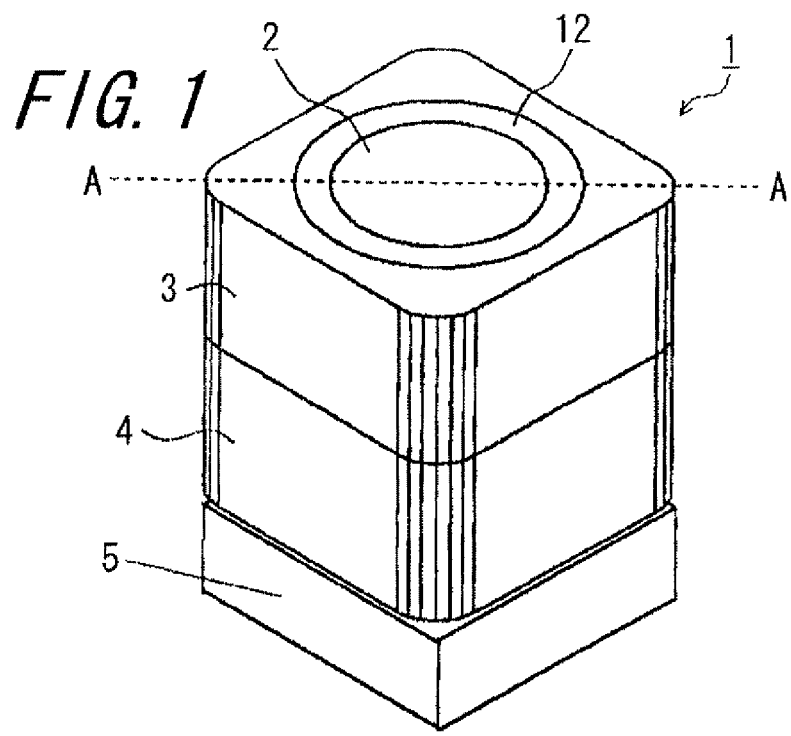
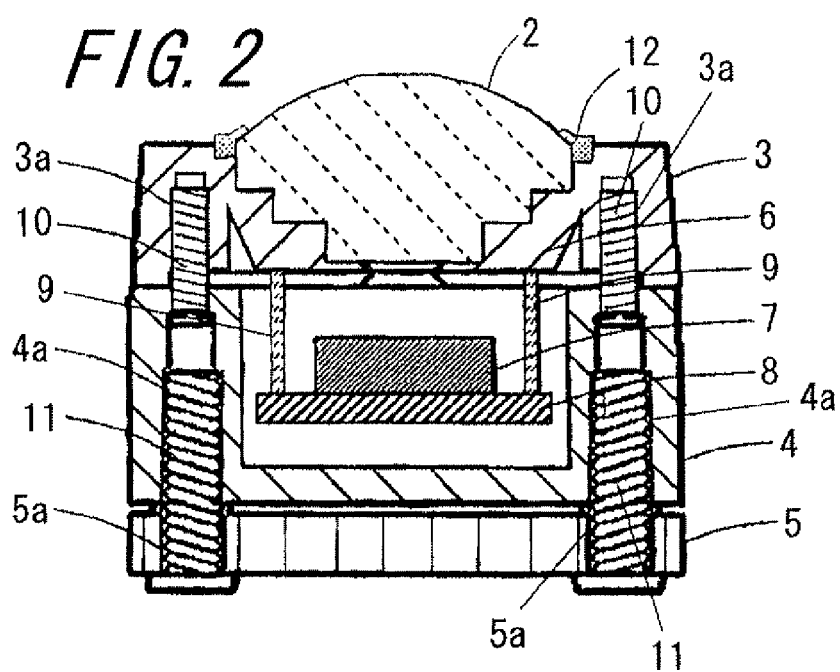

IMAGING MODULE

CROSS-REFERENCE TO THE RELATED APPLICATIONS

This application is a national stage of international application No. PCT/JP2010/052302, filed on Feb. 17, 2010, and claims the benefit of priority under 35 USC 119 to Japanese Patent Application No. 2009-038795, filed on Feb. 23, 2009, the entire contents of which are incorporated herein by reference.

TECHNICAL FIELD

The present invention relates to an imaging module using an imaging device including a semiconductor image sensor or the like such as a CCD image sensor.

BACKGROUND ART

A conventional imaging module having a bracket for mounting to an automobile or the like has, for example, the following construction.

Specifically, the imaging module comprises a front case which is configured to mount a lens unit on a subject side thereof and is configured to install an imaging substrate, mounting an imaging device thereon, at a position on a side opposite to the subject side with the imaging device facing the lens unit, a rear case which is mounted to the front case and configured to seal the imaging substrate in an interior space between the rear case and the front case, and a bracket mounted to the rear case.

In the conventional imaging module constructed as described above, the front case and the rear case are mounted to each other with first screws, and further, the rear case and the bracket are mounted to each other with second screws. And, the first screws and the second screws are respectively screwed into separate screw-fastening portions.

CITATION LIST

Patent Literature

Patent literature 1: Japanese Unexamined Utility Model Publication JP-U 6-72856 (1994)

DISCLOSURE OF INVENTION

Technical Problem

In the conventional imaging module, the front case and the rear case are mounted to each other through screw fastening with the first screws, and further, the rear case and the bracket are mounted to each other through screw fastening with the second screws screwed into a screw fastening portion separate from that for the first screws, resulting in a two-stage screw fastening structure. As a result, the screw fastening portions are rather large, and the imaging module itself is also rather large.

In this connection, when a diameter of the screws is reduced in order to reduce a size of the screw fastening portions to thereby achieve a reduction in a size of the imaging module, a strength of the screw fastening becomes rather insufficient. Then, when the bracket is mounted to an automobile or the like by screw fastening, a fastening force of the second screws is weakened by a vibration of the automobile or the like, so that an optical axis is deviated, which is likely to lead to deterioration in image quality.

Further, due to the weakening of the fastening force of the second screws, the rear case and the bracket are deviated from each other, resulting in deterioration in the water resistance of the imaging module.

The invention has been made in view of the above problems in the related art. It is an object of the invention to reduce the size of the screw fastening portions for mounting the front case, the rear case, and the bracket to each other, thereby achieving a reduction In the size of the imaging module itself. Further, regarding the imaging module, when the bracket is mounted to an automobile or the like by screw fastening while maintaining high screw fastening strength, deviation of the optical axis is suppressed, making it possible to obtain a high quality image and to suppress deterioration in the water resistance of the imaging module.

Solution to Problem

The invention provides an imaging module, comprising: a front case which is configured to mount a lens unit on a subject side and is configured to install an imaging substrate, mounting an imaging device thereon, at a position on a side opposite to the subject side with the imaging device facing the lens unit; a rear case which is mounted to the front case and configured to seal the imaging substrate in an interior space between the rear case and the front case; and an external mounting bracket mounted to the rear case, wherein a screw fastening hole, a first screw fastening through-hole, and a second screw fastening through-hole are formed in the front case, the rear case, and the bracket, respectively, the rear case is mounted to the front case with a first screw which is screwed into the screw fastening hole and the first screw fastening through-hole, and the bracket is mounted to the rear case with a second screw, which is screwed into the first screw fastening through-hole and the second screw fastening through-hole and has a diameter larger than that of the first screw.

Further, in the imaging module of the invention, it is preferable that each of the first screw and the second screws comprises a main body portion with a thread and a head portion with a diameter larger than a diameter of the main body portion, and the diameter of the main body portion of the second screw is larger than the diameter of the head portion of the first screw.

Further, in the imaging module of the invention, it is preferable that the main body portion of the second screw is longer than the main body portion of the first screw.

Advantageous Effects of Invention

According to the invention, an imaging module includes a front case which is configured to mount a lens unit on a subject side and is configured to install an imaging substrate, mounting an imaging device thereon, at a position on a side opposite to the subject side with the imaging device facing the lens unit; a rear case which is mounted to the front case and configured to seal the imaging substrate in an interior space between the rear case and the front case; and an external mounting bracket mounted to the rear case, wherein a screw fastening hole, a first screw fastening through-hole, and a second screw fastening through-hole are formed in the front case, the rear case, and the bracket, respectively, the rear case is mounted to the front case with a first screw which is screwed into the screw fastening hole and the first screw fastening through-hole, and the bracket is mounted to the rear case with a second screw, which is screwed into the first screw fastening through-hole and the second screw fastening through-hole and has a diameter larger than that of the first screw. Therefore, it is possible to coaxially arrange the first screw and the second screw, and to significantly reduce the size of the screw fastening portions for mounting the front case, the rear case, and the bracket, making it also possible to reduce the size of the imaging module itself.

Further, since the diameter of the second screw is larger than that of the first screw, the fastening force of the second screw in mounting is larger than the fastening force of the first screw. As a result, even in a case where the number of first screws used is, for example, four, it is possible to attain a sufficient mounting strength by using two second screws. Thus, the number of second screws used is made smaller than the number of first screws used, making it possible to achieve a reduction in the weight of the imaging module.

Further, since the second screw is larger in diameter than the first screw, it is possible to mount the rear case and the bracket to each other firmly. As a result, when the bracket is mounted to an automobile or the like by screw fastening, it is possible to suppress weakening of the fastening force of the second screw due to vibration of the automobile or the like applied to the imaging module, making it possible to suppress deterioration in image quality due to deviation of the optical axis of the imaging module. Further, since it is possible to suppress weakening of the fastening force of the second screw, it is possible to suppress deviation of the rear case and the bracket from each other, so that it is possible to suppress deterioration in the water resistance of the imaging module.

Further, in the imaging module of the invention, each of the first screw and the second screws comprises a main body portion with a thread and a head portion with a diameter larger than a diameter of the main body portion. When the diameter of the main body portion of the second screw is larger than the diameter of the head portion of the first screw, it is easy to screw the first screw into the screw fastening hole and the first screw fastening through-hole via the second screw fastening through-hole. Further, it is possible to mount the rear case and the bracket to each other more firmly, and when the bracket is mounted to an automobile or the like by screw fastening, it is possible to suppress weakening of the fastening force of the second screw due to vibration of the automobile or the like applied to the imaging module, making it possible to suppress deterioration in image quality due to deviation of the optical axis of the imaging module. Further, since it possible to suppress weakening of the fastening force of the second screw, it is possible to suppress deviation of the rear case and the bracket, so that it is possible to suppress deterioration in the water resistance of the imaging module.

Further, in the imaging module of the invention, when the main body portion of the second screw is longer than the main body portion of the first screw, it is possible to mount the rear case and the bracket more firmly to each other, and, when the bracket is mount to an automobile or the like by screw fastening, it is possible to suppress weakening of the fastening force of the second screw due to vibration of the automobile or the like applied to the imaging module, making it possible to suppress deterioration in image quality due to deviation of the optical axis of the imaging module. Further, since it is possible to suppress weakening of the fastening force of the second screw, it is possible to suppress deviation of the rear case and the bracket, so that it is possible to suppress deterioration in the water resistance of the imaging module.

BRIEF DESCRIPTION OF DRAWINGS

FIG. 1 is a perspective view showing a basic construction showing an example of an imaging module according to an embodiment of the invention; and FIG. 2 is a longitudinal sectional view taken along the line A-A of the example of an imaging module shown in FIG. 1.

DESCRIPTION OF EMBODIMENTS

In the following, an embodiment of the imaging module of the invention will be described in detail with reference to the drawings.

FIGS. 1 and 2 show an example of an imaging module according to an embodiment of the invention. FIG. 1 is a perspective view showing a basic construction of an imaging module, and FIG. 2 is a longitudinal sectional view taken along the line A-A of FIG. 1.

A module 1 of this embodiment comprises a front case 3 which is configured to mount a lens unit 2 on a subject side and is configured to install an imaging substrate 8, mounting an imaging device 7 thereon, at a position on a side opposite to the subject side with the imaging device 7 facing the lens unit 2; a rear case 4 which is mounted to the front case 3 and configured to seal the imaging substrate 8 in an interior space between the rear case and the front case 3; and an external mounting bracket 5 mounted to the rear case 4. The front case 3, the rear case 4 and the bracket 5 have screw fastening holes 3a, first screw fastening through-holes 4a, and second screw fastening through-holes 5a, respectively. The rear case 4 is mounted to the front case 3 with first screws 10 which is screwed into the screw fastening holes 3a and the first screw fastening through-holes 4a, and the bracket 5 is mounted to the rear case 4 with second screws 11, which is screwed into the first screw fastening through-holes 4a and the second screw fastening through-holes 5a and has a diameter larger than that of the first screws 10.

According to the above construction, it is possible to coaxially arrange the first and second screws 10 and 11, and to significantly reduce the size of the screw fastening portions for mounting the front case 3, the rear case 4, and the bracket 5, making it possible to achieve a reduction in the size of the imaging module 1 itself.

Further, since the second screws 11 are larger in diameter than the first screws 10, the fastening force of the second screws 11 at the time of mounting is larger than the fastening force of the first screws 10. As a result, even in a case where four first screws 10 are used, it is possible to obtain a sufficient mounting strength by using two second screws 11. Thus, it is possible to make the number of second screws 11 used smaller than the number of first screws 10 used, thereby achieving a reduction in the weight of the imaging module 1.

Further, since the second screws 11 are larger in diameter than the first screws 10, it is possible to mount the rear case 4 and the bracket 5 to each other firmly. As a result, when the bracket 5 is mounted to an automobile or the like, it is possible to suppress weakening of the fastening force of the second screws 11 due to vibration of the automobile or the like applied to the imaging module 1, making it possible to suppress deterioration in image quality due to deviation of the optical axis of the imaging module 1. Further, since it is possible to suppress weakening of the fastening force of the second screws 11, it is possible to suppress deviation of the rear case 4 and the bracket 5 from each other, thereby suppressing deterioration in the water resistance of the imaging module 1.

Further, before the mounting of the bracket 5, the first screws 10 are not visible from the subject side of the front case 3, and, further, after the mounting of the bracket 5, they are not visible from its exterior, whereby it is possible to avoid deterioration in outward appearance.

While the first and second screws 10 and 11 are coaxially arranged, it is not necessary for them to be arranged completely coaxially but the axes of the first screws 10 may be somewhat deviated from the axes of the second screws 11. For example, the axes of the first screws 10 and the axes of the second screws 11 may be deviated from each other by approximately 2 mm or less; so long as the deviation is of this order, the above-mentioned effect can be attained.

It is preferable that the diameter of the main body portion with thread of the second screw 11, which is larger in diameter than the first screw 10, is 1.5 to 3 times the diameter of the main body portion of the first screw 10. By setting the diameter of the main body portion with thread of the second screw 11 within this range, it is possible to suppress a change in optical axis length between the lens unit 2 and the imaging device 7 and deviation of the optical axis, and further, it is possible to suppress an increase in the size of the screw fastening portions.

Further, a plurality of sets of first and second screws 10 and 11 may be provided. In this case, when mounting the front case 3, the rear case 4, and the bracket 5, it is possible to more effectively suppress a change in the optical axis length between the lens unit 2 and the imaging device 7 and deviation of the optical axis.

In the case where a plurality of sets of first and second screws 10 and 11 are provided, when adjacent sets are compared, it is preferable that the screw fastening rotating direction of one of the adjacent sets is opposite to the screw fastening rotating direction of the other set. In this case, the distortions due to the stresses caused by the screwing cancel out each other, so that it is possible to suppress deformation due to distortion of the front case 3, the rear case 4, and the bracket 5.

The imaging module 1 is installed, for example, in a vehicle, and has a function to image a white line on the road surface or to image a blind spot of the driver driving the vehicle, with its operation being controlled by an ECU (Electronic Control Unit) for executing vehicle travel control. An electric signal outputted from the imaging module 1 is converted to an image signal by the ECU, and is displayed on a display installed, for example, in front of the driver's seat.

The imaging device 7 is a semiconductor image sensor device such as a CCD image sensor or a CMOS image sensor.

The lens unit 2 has a function to condense light from the subject on the imaging device 7, and includes a lens group composed, for example, of a first lens convex on the front side for condensing light at wide angle, second lens for collimating the light transmitted through the first lens, and a third lens. In the case in which the lens unit 2 is composed of the above-mentioned three lenses, the lenses are arranged so as to be superimposed one upon the other in the optical axis direction, for example, in the order: the first lens, the second lens, and the third lens as from the front side (i.e., the subject side, which is the upper side in FIG. 2). The lens unit 2 may have four or more lenses.

A case mounts and holds the lens unit 2 situated on the front side to support the same. The case is divided into the front case 3 and the rear case 4, which are integrally mounted to each other. The front case 3 is composed, for example, of an annular retainer 12 arranged on the front side and serving as a presser member which presses the first lens of the lens unit 2 toward the rear side (the side opposite to the subject side) with respect to the front case 3, and a generally cylindrical lens barrel 6 arranged on the rear side of the retainer 12 and serving as a lens retaining member. The second lens and the third lens are mounted to the lens barrel 6 of the front case 3, and the first lens is mounted in position by the retainer 12 so as to be pressed against the lens barrel 6.

The retainer 12 and the lens barrel 6 are prepared, for example, by a method as described below.

The lens barrel 6 can be prepared by an injection molding in which there is prepared an injection molding mold having a cavity provided in conformity with the configuration of the lens barrel 6 and in which the material of the lens barrel 6 is poured into this cavity and solidified for molding into a predetermined shape. Similarly, the retainer 12 can be prepared by preparing an injection molding mold having a cavity formed in conformity with the configuration of the retainer 12 and pouring the material of the retainer 12 into this cavity to solidify the same for molding into a predetermined shape. The retainer 12 and the lens barrel 6 are formed of an insulating resin such as polycarbonate (PC) or polyphthalamide (PPA), thereby achieving a reduction in weight. Usually, in order that the retainer 12 and the lens barrel 6 may be matched with each other in terms of thermal expansion and thermal shrinkage, it is preferable that both of them are formed of the same material.

The imaging substrate 8 is mounted to the rear side of the imaging module 1. The imaging device 7 accommodated in a package formed of a ceramic material, resin or the like is installed on a main surface on the front side of the imaging substrate 8.

The mounting of the imaging device 7 to the case is effected by mounting the imaging device 7 on the main surface on the front side of the imaging substrate 8 and mounting the imaging substrate 8 to the front case 3 via connection terminals 9, solder, etc.

The imaging substrate 8 is formed by a printed circuit board formed, for example, by impregnating a glass cloth with epoxy resin or adding glass filler to epoxy resin. On the surface of and inside the imaging substrate 8, there are formed a wiring conductor for electrical connection between the imaging device 7 mounted and the terminals of other components, etc. different therefrom and their fixation, and ground wiring for grounding. The wiring conductor and the ground wiring are formed on the surface of or within the printed circuit board, for example, by a method in which they are formed by plating using a conductive metal such as copper or gold, a method in which a metal foil previously formed into a wiring pattern is bonded, or a method in which unnecessary portions are removed by etching from the board whose entire surface is covered with a metal foil.

The imaging substrate 8 is produced by preparing, for example, a copper-coated board on the market whose entire front and back surfaces are coated with a copper foil, cutting the copper-coated board in a desired size, and performing etching on the copper foil covering the surface to form the same into a desired wiring pattern by using an acidic solution such as diluted hydrochloric acid. It is also possible, as needed, to form a through-hole by using a laser or a drill, fill the through-hole with metal paste to thereby embed a through conductor, and electrically connect wiring patterns on the front and back surfaces of the board.

On the main surface on the rear side of the imaging substrate 8, there may be mounted components such as an IC (not shown) processing an electric signal from the imaging device 7, and a connector (not shown) for connecting a cable (not shown) for electrically connecting wiring conductors of the imaging substrate 8 and the ECU.

Like the front case 3, the rear case 4 can be prepared through injection molding. That is, there is prepared an injection molding mold having a cavity provided in conformity with the configuration of the rear case 4, and the material of the rear case 4 is poured into this cavity and solidified for molding into a predetermined shape.

The front case 3 and the rear case 4 may be formed of a metal such as stainless steel, aluminum, or brass (copper-zinc alloy). In this case, heat generated in the imaging module is conducted from the front case 3 and the rear case 4 to the bracket 5 via the first and second screws 10 and 11, making it possible to efficiently dissipate the heat to the exterior from the bracket 5.

The bracket 5 is a plate-like protrusion for mounting the imaging module 1 to an external machine, apparatus or the like such as an automobile, and has the through-holes 5a for mounting to the external machine, apparatus or the like by screw fastening. The configuration of the bracket 5 is not restricted to a plate-like shape, and it may be a configuration with a side wall portion protecting the case, e.g., a dish-like configuration, a box-like configuration or the like. The bracket 5 is formed, for example, of a resin such as polycarbonate (PC) or polyphthalamide (PPA), or a metal such as stainless steel, copper, or aluminum.

Further, in the imaging module 1 of this embodiment, it is preferable that the rear case 4 accommodates, at an inside thereof, the imaging substrate 8 on which the imaging device 7 is positioned with respect to the lens unit 2. In this case, the imaging substrate 8 positioned is protected by the rear case 4, and the case composed of the front case 3 and the rear case 4 can be reduced in size. Further, the interior space of the case is solely that of the rear case 4, thus making it possible to diminish the interior space of the case.

Further, in the imaging module 1 of this embodiment, it is preferable that each of the first and second screws 10 and 11 comprises a main body portion with a thread and a head portion with a diameter larger than a diameter of the main body portion, and the diameter of the main body portion of the second screw 11 is larger than the diameter of the head portion of the first screw 10.

According to this construction, the first screws 10 can be easily screwed into the screw fastening holes 3a and the first screw fastening through-holes 4a via the second screw fastening through-holes 5a. Further, the rear case 4 and the bracket 5 can be firmly mounted together. As a result, when the bracket 5 is mounted to an automobile or the like by screw fastening, it is possible to suppress weakening of the fastening force of the second screws 11 due to vibration of the automobile or the like applied to the imaging module 1, making it possible to suppress deterioration in image quality due to deviation of the optical axis of the imaging module 1. Further, since it is possible to suppress weakening of the fastening force of the second screws 11, it is possible to suppress deviation of the rear case 4 and the bracket 5, so that it is possible to suppress deterioration in the water resistance of the imaging module 1.

In this case, it is preferable that the diameter of the main body portion of the second screw 11 is over 1 time the diameter of the head portion of the first screw 10 and not more than double the same. By setting the diameter of the main body portion of the second screw 11 within this range, it is possible to suppress a change in the optical axis length between the lens unit 2 and the imaging device 7 and deviation of the optical axis, and further, it is possible to suppress an increase in the size of the screw fastening portions.

In the imaging module 1 of this embodiment, it is preferable that the main body portion of the second screw 11 is longer than the main body portion of the first screw 10.

In this construction, it is possible to firmly mount the rear case 4 and the bracket 5. As a result, when the bracket 5 is mounted to an automobile or the like by screw fastening, it is possible to suppress weakening of the fastening force of the second screws 11 due to vibration of the automobile or the like applied to the imaging module 1, making it possible to suppress deterioration in image quality due to deviation of the optical axis of the imaging module 1. Further, since it is possible to suppress weakening of the fastening force of the second screws 11, it is possible to suppress deviation of the rear case 4 and the bracket 5, making it possible to suppress deterioration in the water resistance of the imaging module 1.

In this case, it is more desirable for the length of the second screw 11 to be 1.5 times to 3 times the length of the first screw 10. By setting the length of the second screw 11 within this range, it is possible to suppress a change in the optical axis length between the lens unit 2 and the imaging device 7 and deviation of the optical axis. Further, it is possible to suppress an increase in the length of the imaging module 1 in the screw fastening direction (optical axis direction).

The first and second screws 10 and 11 may be self tapping screws. In this case, it is possible to use the front case 3 and the rear case 4 of a material allowing self tapping (screw thread cutting by a screw) such as resin, and the front case 3 and the rear case 4 can be prepared by using an inexpensive material easily allowing molding.

EXAMPLE

In the following, an example of the imaging module 1 of the invention will be described.

An imaging module of the embodiment constructed as shown in FIGS. 1 and 2 was prepared as follows. First, there were prepared the rectangular-box-shaped front case 3 formed of polycarbonate, and the square-box-shaped rear case 4 formed of polycarbonate through injection molding. The front case 3 had a square sectional configuration of a size of 23 mm long, 23 mm wide and 10 mm high, and the rear case 4 had a square sectional configuration of a size of 23 mm long, 23 mm wide and 13 mm high. Further, the front case 3 contains the cylindrical lens barrel 6 at an inside thereof.

Next, the lens unit 2 composed of three lenses was attached to the lens barrel 6 inside the front case 3, and the lens unit 2 was secured by the annular retainer 12. Further, the connection terminals 9 provided in the lens barrel 6 inside the front case 3 were passed through the through-holes of the imaging substrate 8 on whose subject-side main surface the imaging device 7 was installed, and the connection terminals 9 were bonded to electrode pads around the through-holes via solder, thereby mounting the imaging substrate 8 to the front case 4.

Next, the front case 3 and the rear case 4 were mounted with the first screws 10 screwed into the screw fastening holes 3a and the first screw fastening through-holes 4a, and the rear case 4 and the bracket 5 were mounted with the second screws 11, which is larger in diameter than the first screws 10, screwed into the first screw fastening through-holes 4a and the second screw fastening through-holes 5a. As a result, the imaging substrate 8 was sealed in the interior space formed by the front case 3 and the rear case 4.

At this time, the diameter of the main body portion of the second screw 11 (2.6 mm) was 1.86 times the diameter of the main body portion of the first screw 10 (1.4 mm), the diameter of the main body portion of the second screw 11 was 1.3 times the diameter of the head portion of the first screw 10 (2 mm), and the length of the second screw 11 (6.5 mm) was 1.625 times the length of the first screw 10 (4 mm).

As a comparative example, there was prepared an imaging module by mounting a front case and a rear case with first screws, and, further, mounting the rear case and a bracket with second screws screwed into a screw fastening portion separate from that for the first screws. In this imaging module, the front case has a square sectional configuration having a size of 25 mm long, 25 mm wide and 12 mm high, and the rear case 4 has a square sectional configuration having a size of 25 mm long, 25 mm wide and 19 mm high.

When the size of the imaging module 1 of the example thus obtained and that of the imaging module of the comparative example were compared with each other in terms of volume ratio, the size of the imaging module 1 of the example was approximately 0.67 times the size of the imaging module of the comparative example, which indicates a significant reduction in size.

Further, in the imaging module of the example, the second screw 11 is larger in diameter than the first screw 10, so that the rear case 4 and the bracket 5 could be firmly mounted together. As a result, it was possible to suppress weakening of the fastening force of the second screws 11, to suppress deterioration in image quality due to deviation of the optical axis of the imaging module 1, to suppress deviation of the rear case 4 and the bracket 5 from each other, and to suppress deterioration in the water resistance of the imaging module 1.

The invention is not restricted to the embodiment and example described above but allows various modifications without departing from the gist of the invention.

REFERENCE SIGNS LIST

1 Imaging module
2 Lens unit
3 Front case
3a Screw fastening hole
4 Rear case
4a First screw fastening through-hole
5 Bracket
5a Second screw fastening through-hole
7 Imaging device
8 Imaging substrate
10 First screw
11 Second screw

The invention claimed is:

1. An imaging module, comprising:
    a front case which is configured to mount a lens unit on a subject side and is configured to install an imaging substrate, mounting an imaging device thereon, at a position on a side opposite to the subject side with the imaging device facing the lens unit;
    a rear case which is mounted to the front case and configured to seal the imaging substrate in an interior space between the rear case and the front case; and
    an external mounting bracket mounted to the rear case, wherein
    a screw fastening hole, a first screw fastening through-hole, and a second screw fastening through-hole are formed in the front case, the rear case, and the bracket, respectively,
    the rear case is mounted to the front case with a first screw which is screwed into the screw fastening hole and the first screw fastening through-hole, and
    the bracket is mounted to the rear case with a second screw, which is screwed into the first screw fastening through-hole and the second screw fastening through-hole and has a diameter larger than that of the first screw.

2. The imaging module according to claim 1, wherein each of the first screw and the second screw comprises a main body portion with a thread and a head portion with a diameter larger than a diameter of the main body portion, and the diameter of the main body portion of the second screw is larger than the diameter of the head portion of the first screw.

3. The imaging module according to claim 2, wherein the main body portion of the second screw is longer than the main body portion of the first screw.

* * * * *